United States Patent [19]

Miki et al.

[11] Patent Number: 4,661,735

[45] Date of Patent: Apr. 28, 1987

[54] ARRANGEMENT FOR MOUNTING A PLURALITY OF MOTORS

[75] Inventors: Tatsuya Miki, Sagamihara; Takashi Saito, Ayase; Yukihiro Kishima, Yokohama, all of Japan

[73] Assignee: Victor Company of Japan, Limited, Kanagawa, Japan

[21] Appl. No.: 774,831

[22] Filed: Sep. 11, 1985

[30] Foreign Application Priority Data

Sep. 19, 1984 [JP] Japan .............................. 59-141830[U]

[51] Int. Cl.⁴ ...................... G11B 21/08; H02K 17/34
[52] U.S. Cl. ...................................... 310/112; 310/85; 310/256; 360/97
[58] Field of Search .................... 290/1 R; 310/83, 89, 310/91, 112, 113, 114, 126, 156, 268, 85, 256; 360/97, 98, 106

[56] References Cited

U.S. PATENT DOCUMENTS

| | | | |
|---|---|---|---|
| 4,323,939 | 4/1982 | Iftikar et al. | 360/106 |
| 4,339,777 | 7/1982 | Gruczelak | 360/97 |
| 4,423,446 | 3/1981 | Takahashi et al. | 360/106 |

FOREIGN PATENT DOCUMENTS 654960 7/1951 United Kingdom ................ 310/112

Primary Examiner—Patrick R. Salce
Assistant Examiner—D. L. Rebsch
Attorney, Agent, or Firm—Jordan and Hamburg

[57] ABSTRACT

A plurality of motors are arranged on opposite surfaces of a single magnetic base plate such that they are magnetically isolated from each other by the base plate. Such an arrangement prevents the motors from magnetically interfering with each other and, thereby, allows them to be positioned as close to each other as possible, in order to cut down the overall size of an apparatus in which the motors are installed.

7 Claims, 3 Drawing Figures

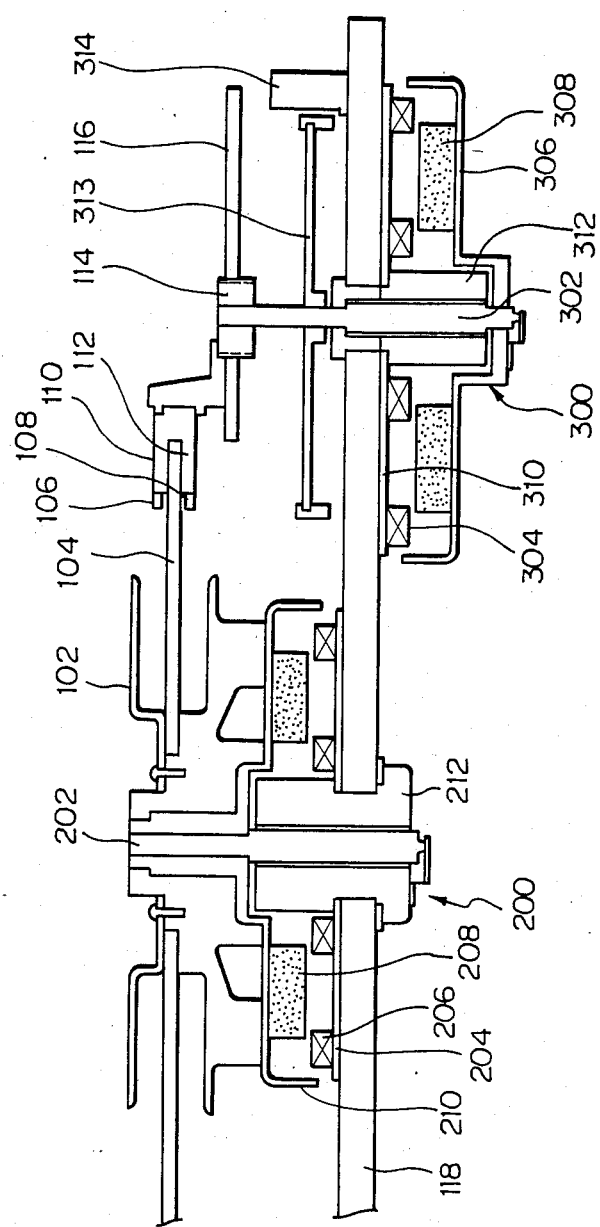

ARRANGEMENT FOR MOUNTING A PLURALITY OF MOTORS

BACKGROUND OF THE INVENTION

The present invention relates to an arrangement for mounting a plurality of motors and, more particularly, to such an arrangement which allows the motors to be positioned close to each other and/or accurately relative to each other.

There has been proposed a motor of the type having a stator coil mounted on a magnetic base plate, surfaces of which are treated for insulation, a shaft rotatably supported by a bearing, a plate rigidly mounted on the shaft, and a rotor magnet supported by the plate to face the stator coil. In such a motor configuration, the magnetic base plate fulfills the role of a yoke which sets up a magnetic path in cooperation with the stator coil.

The problem with a motor of the type described is that, where a plurality of such motors are mounted close to each other on a single magnetic base plate or yoke, as mentioned above, a leakage flux of the nearby motors magnetically interfere with each other to cause eccentric rotation and other undesirable disturbances which obstruct accurate rotation of the shafts of the motors. The demand for a solution to this problem has been especially keen in relation to a disk drive of the type having a plurality of magnetic disks, magnetic heads, and motors for driving the heads and disks, all of, which are hermetically built in a disk enclosure. That is, such a disk drive has heretofore failed to achieve a compact configuration required for keeping an enough spacing between adjacent motors to eliminate their mutual magnetic interference.

SUMMARY OF THE INVENTION

It is therefore an object of the present invention to provide an arrangement which allows a plurality of motors to be mounted closely adjacent to each other on a single magnetic base plate while eliminating mutual magnetic interference therebetween.

It is another object of the present invention to allow a plurality of motors to be accurately arranged in their predetermined positions and, thereby, hold them in an accurate relative position.

It is another object of the present invention to provide a generally improved arrangement for mounting a plurality of motors.

In an arrangement for mounting a plurality of motors on a single ferromagnetic base plate, each of the motors including a stator coil mounted on the base plate, a rotor magnet located to face the stator coil, and a shaft on which the rotor magnet is mounted, the present invention provides an improvement wherein the stator coils of those motors which immediately neighbor each other are mounted on opposite surfaces of the ferromagnetic base plate.

In accordance with the present invention, a plurality of motors are arranged on opposite surfaces of a single magnetic base plate such that they are magnetically isolated from each other by the base plate. Such an arrangement prevents the motors from magnetically interfering with each other and, thereby, allows them to be positioned as close to each other as possible in order to cut down the overall size of an apparatus in which the motors are installed.

The other objects, features and advantages of the present invention will become more apparent from the following detailed description taken with the accompanying drawings.

BRIEF DESCRIPTION OF THE DRAWINGS

FIG. 3 is a schematic sectional side elevation showing an essential part of the disk drive of FIG. 2.

DESCRIPTION OF THE PREFERRED EMBODIMENT

While the arrangement for mounting a plurality of motors of the present invention is susceptible of numerous physical embodiments, depending upon the environment and requirements of use, a substantial number of the herein shown and described embodiments have been made, tested and used, and all have performed in an eminently satisfactory manner.

Figure 1:
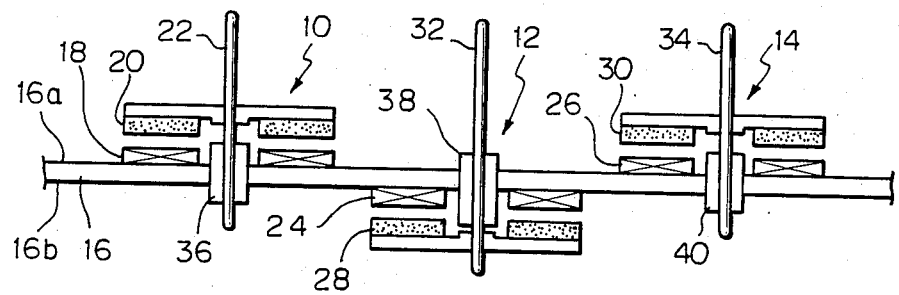
FIG. 1 is a section showing the principle of an arrangement in accordance with the present invention.

Referring to FIG. 1 of the drawings, a basic construction in accordance with the present invention is shown. A plurality of motors, which are represented by three motors 10, 12 and 14 by way of example, are mounted on a ferromagnetic base plate 16, such as one made of steel or iron, whose surfaces are treated for insulation. The motor 10 comprises a stator coil 18, a rotor magnet 20 which faces the stator coil 18, and a shaft 22 on which the rotor magnet 20 is rigidly mounted. Likewise, the other motors 12 and 14 comprise respectively stator coils 24 and 26, rotor magnets 28 and 30, and shafts 32 and 34. The gist of the present invention lies in locating the stator coil 18, 24 or 26 of each of the motors 10, 12 and 14 on one of the two surfaces 16a and 16b of the base plate 16 which are opposite to the other surface on which the stator coil of the immediately neighboring motor is located, i.e., the stator coil 18 on the surface 16a, the stator coil 24 on the surface 16b, and the stator coil 26 on the surface 16a.

In the arrangement shown in FIG. 1, while magnetic fluxes leak from the respective stator coils 18, 24 and 26, the magnetic base plate 16 serves as a shield which prevents the magnetic fluxes from affecting the magnetic circuits associated with the nearby motors.

Meanwhile, the shafts 22, 32 and 34 of the motors 10, 12 and 14 respectively are rotatably supported by bearings 36, 38 and 40 which in turn are rigidly mounted on the base plate 16. This offers another advantage, that the shafts 22, 32 and 34 can be positively and accurately positioned relative to each other simply by accurately positioning the bearings 36, 38 and 40, all on the single common base plate 16.

Figure 2:
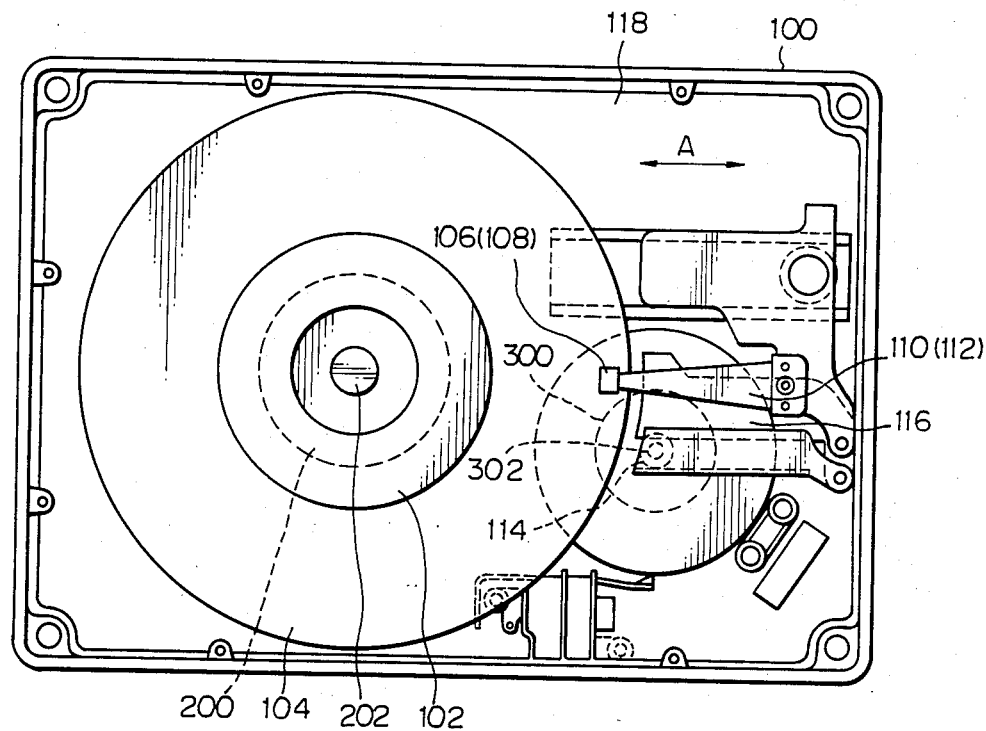
FIG. 2 is a fragmentary plan view of a disk drive to which an arrangement embodying the present invention is applied.

Referring to FIGS. 2 and 3, a disk drive to which an arrangement embodying the present invention is applied is shown. The disk drive comprises a housing, or disk enclosure, 100. Various structural elements are built in the housing 100 such as a disk holder 102, a magnetic disk 104 which is retained by the disk holder 102, and magnetic heads 106 and 108 adapted to record and reproduce various kinds of data signals into and out of the disk 104.

A spindle motor, generally 200, has a shaft 202 which carries the disk holder 102 integrally therewith. As the spindle motor 200 is energized to rotate, it causes the disk 12 to rotate at a high speed through the shaft 202 and disk holder 102.

Jimbal arms 110 and 112 operatively connect, respectively, the magnetic heads 106 and 108 to a linear head transport mechanism. As shown, the linear head transport mechanism includes a pinion 114 and a rack 116 which is held in constant mesh with the pinion 114.

As access motor, generally 300, includes a shaft 302 on which the pinion 114 of the head transport mechanism is mounted. In this construction, rotation of the access motor 300 is transformed by the cooperative rack 116 and pinion 114 into linear movement so that the heads 106 and 108 are driven in a linear motion in the radial direction of the disk 104 as indicated by an arrow A in FIG. 2.

Although not shown in the drawings, each of the heads 106 and 108 is electrically interconnected to another apparatus by signal lines in order to exchange various kinds of data signal therewith.

A plate 118 which is made of iron or steel to serve as a ferromagnetic base plate is installed in the housing 100. The plate 118 has its surfaces treated for electrical insulation. The spindle motor 200 and the access motor 300 are rigidly mounted in predetermined positions on the base plate 118.

In detail, as shown in FIG. 3, the access motor 300 comprises the previously mentioned shaft 302, a stator coil 304, a yoke 306 supported by the lower end of the shaft 302, and a rotor magnet 308 mounted on the yoke 306 to face the stator coil 304. The stator coil 304 is adhered to the underside of the base plate 30 through a flat coil base 310 which may be in a form of printed circuit board. The shaft 302 is rotatably supported by a bearing 312 which in turn is provided in a predetermined position of the base plate 118.

A disk-like scale 313 is mounted on an upper portion of the shaft 302 of the access motor 300. The scale 313 is magnetized such that N- and S-poles alternate each other along the cicumference of the scale 313 at predetermined pitches. A ferromagnetic magnetoresistance (MR) element unit 314 is mounted on the base plate 118 and in the vicinity of the periphery of the magnetized scale 313. The MR element unit 314 is responsive to changes in the magnetic field which surrounds the scale 313 and varies due to rotation of the access motor 300. The output of the MR element unit 314 is used to control the velocity and direction of rotation of the access motor 300 and, thereby, the position of the magnetic heads 106 and 108 relative to the disk 104.

As described above, except for the periphery of the scale 313, the base plate 118 which is made of iron intervenes between the MR element unit 314 together with scale 313 and the stator coil 304 etc. of the access motor 300, it frees the MR element unit 314 from the leakage flux of the stator coil 304 and, thereby, promotes accurate control over the rotation of the access motor 300.

Meanwhile, the spindle motor 200 is arranged on the other or upper surface of the base plate 118 over a substantial part thereof. As shown in FIG. 3, the spindle motor 200 comprises the previously mentioned shaft 202, a coil base 204, a stator coil 206, a rotor magnet 208 positioned to face the stator coil 206, a yoke 210 which carries the rotor magnet 208 therewith. The shaft 202 is rotatably supported by a bearing 212, while the yoke 210 is mounted on the shaft 202. The stator coil 206 of the spindle motor 200, as well as the stator coil 304 of the access motor 300, is supplied with a current by way of a power supply line, not shown.

As described hereinabove, in the illustrative embodiment, the stator coil 206 of the spindle motor 200 and that 304 of the access motor 300 are arranged, one on the upper surface of the single base plate 118 and the other on the lower surface as viewed in FIG. 3. The stator coil 206 faces the rotor magnet 208 and yoke 210, and the stator coil 304 the rotor magnet 308 and yoke 306. In this construction, magnetic fluxes leaking from the stator coils 206 and 304 are intercepted, or shielded, by the base plate 118 so that their associated motors 200 and 300 are prevented from adversely affecting each other.

In a disk drive of the type to which the illustrative embodiment pertains, should the shafts 202 and 302 of the motors 200 and 300 be inaccurately positioned relative to each other, the heads 106 and 108 would fail to properly record and reproduce signals into and out of the disk 104. The illustrative embodiment of the present invention insures an accurate relative position between the shafts 202 and 302 only if the bearings 212 and 312 are accurately positioned on the base plate 118.

In summary, it will be seen that the present invention provides an arrangement which allows a plurality of motors to be provided on a single magnetic base plate, which constitutes a part of a magnetic circuit associated with each of the motors, without causing them to magnetically interfere with each other. In addition, each of the motors can be accurately positioned relative to the others merely by accurately positioning a bearing which is adapted to receive a shaft of the motor.

Various modifications will become possible for those skilled in the art after receiving the teachings of the present disclosure without departing from the scope thereof.

What is claimed is:

1. A motor mounting arrangement for mounting a plurality of motors comprising a single ferromagnetic base plate, electrical insulating means provided on the surfaces of said base plate for electrically insulating said base plate, each of the motors including a stator coil mounted on the base plate over said insulating means, a rotor magnet located to face the stator coil, and a shaft on which the rotor magnet is mounted, the stator coil of those motors which immediately neighbor each other being mounted on the opposite surfaces of the base plate.

2. A motor mounting arrangement as claimed in claim 1, wherein the motors comprise a spindle motor and an access motor of a disk drive.

3. A motor mounting arrangement as claimed in claim 2, wherein the stator coil of the spindle motor is mounted on an upper surface of the base plate, and the stator coil of the access motor on a lower surface of the base plate.

4. A motor mounting arrangement as claimed in claim 1 wherein said base plate is generally flat.

5. A motor mounting arrangement as claimed in claim 4 wherein each of said motors has bearings for rotatably supporting its respective shaft, and means mounting said bearings on said base plate.

6. A motor mounting arrangement as claimed in claim 1, wherein said insulating means comprises a printed circuit board.

7. A motor mounting arrangement as claimed in claim 1, wherein at least one of said motors has a magnetized scale mounted on said shaft and a magnetoresistance element mounted on the base plate.

* * * * *